United States Patent [19]

Stollenwerk et al.

[11] 4,214,519

[45] Jul. 29, 1980

[54] HORIZONTAL FRUIT PRESS AND PROCESS FOR PRESSING FRUIT

[76] Inventors: Hubert C. Stollenwerk; Hubert F. Stollenwerk, both of Darnstadt Ave., Egg Harbor City, N.J. 08215

[21] Appl. No.: 8,402

[22] Filed: Feb. 1, 1979

Related U.S. Application Data

[63] Continuation-in-part of Ser. No. 789,729, Apr. 21, 1977, abandoned.

[51] Int. Cl.³ .......................... A47J 19/02; B30B 5/00

[52] U.S. Cl. ...................................... 100/37; 100/127; 100/264

[58] Field of Search ................. 100/37, 110, 116, 126, 100/127, 128, 129, 218, 240, 244, 245, 246, 249, 251, 269 R, 131, 132, 178, 179, 185, 198, 214, 215, 224, 259, 269, 50, 51

[56] References Cited

U.S. PATENT DOCUMENTS

| | | | |
|---|---|---|---|
| 2,422,895 | 6/1947 | Habenicht | 100/127 X |
| 2,705,916 | 4/1955 | Millgard | 100/264 X |
| 2,750,878 | 6/1956 | Polk | 100/37 |
| 3,070,003 | 12/1962 | Stacy | 100/51 |

FOREIGN PATENT DOCUMENTS

| | | | |
|---|---|---|---|
| 1397133 | 6/1975 | United Kingdom | 100/116 |

*Primary Examiner*—Edward J. McCarthy

[57] ABSTRACT

Fruit press comprising a substantially rigid enclosure or cage having two parallel, vertical open ends and a closeable top for introduction of fruit pulp or other material to be deliquified, and including two platens, one abutting each of the two open ends of said enclosure, one of said platens adapted to substantially tightly and slidably seat in said enclosure and compress material to be deliquified against the other platen to form a cake, said other platen then being indexable away from said enclosure while the first platen indexes slightly beyond the distal end of said enclosure to displace said press cake out of said enclosure. Liquid is expressed from said press cake by drainage through suitable channels in the faces of one or both of the platens and/or the sides and bottom of the enclosure. The process comprises the steps of placing fruit or other material to be deliquified in a substantially rigid enclosure having parallel vertically extending open ends, rigidly supporting said fruit or other material at one of said open ends while compressing it from the other said open ends, and contemporaneously rapidly draining the expressed liquid therefrom, to create a press cake have a predetermined thickness, indexing the backup platen from said enclosure a distance greater than the thickness of said press cake and displacing said compressing means a further distance approximately equal to the thickness of said press cakes to discharge the cake from the enclosure.

6 Claims, 13 Drawing Figures

HORIZONTAL FRUIT PRESS AND PROCESS FOR PRESSING FRUIT

REFERENCE TO RELATED CASE

This is a continuation-in-part of U.S. Patent Application, Ser. No. 789,729, filed Apr. 21, 1977, abandoned.

In a preferred embodiment of the invention apertures in the press platen and the back-up platen, through which expressed liquid is drained, are formed by spaces between fixed and movable platen face members. During a return portion of the press cycle, the movable face members are displaced with respect to the fixed members, in order to dislodge any pulp from the material being deliquified, prevent blockage of the drainage channels and permit optimum drainage of liquid from the platen area.

BACKGROUND OF THE INVENTION

1. Field of the Invention.

The invention relates to fruit presses which operate to dejuice, dewater or deoil fruits and other liquid-containing materials, such as grapes, apples, pears, crabapples, sugar beets, berries, cherries, olives, pineapples, hops and other herbs, spent grain, sludges, such as sewage sludges, and seeds, such as olive oil seeds, sesame seeds, peanuts, linseeds and the like.

2. State of the Art.

Numerous machines have been designed and utilized for the purpose of dejuicing, dewatering and deoiling fruits and other materials, and most usually for dejuicing such fruits as apples, grapes and pears, for example. A number of different types of presses have been developed for this purpose, and a typical such device of current usage includes a plurality of horizontally extending, vertically moveable platens, operated by suitable hydraulic systems which compress the fruit against a table, the fruit being contained in a specially designed press cloth.

Our U.S. Pat. No. 4,033,253, issued July 5, 1977, is directed to an improvement on the foregoing state-of-the-art apparatus and processes, using a rigid-sided conveyor means to contain the fruit mash. However, the state-of-the-art devices and the apparatus of our U.S. Pat. No. 4,033,253 have several substantial limitations, among which are the expense of plural platens and control systems therefor and of the conveyor system and related equipment. The apparatus of our U.S. Pat. No. 4,033,253 also requires the additional expense, and potential for mechanical difficulties, of the moving sides and the control means therefor.

The use of press apparatus including at least one horizontally moveable compressing device is known in the art, and U.S. Pat. No. 3,070,003 shows such a press utilizing and compressing cylinder 12 and indexing back-up closer 18, which acts as a barrier against which the material is compressed remains fixed while the enclosure 15 indexes rearwardly, as seen in FIG. 4, to discharge cake 3. Other relevant patents known to applicant are U.S. Pat. Nos. 115,731, 165,076, 215,606, 250,979, 1,345,963, 1,922,513, 2,738,550, 3,055,289, 3,082,682, 3,550,775, 3,673,952 and 3,828,663. References cited in the parent case are U.S. Pat. Nos. 701,882, 1,071,020, 1,135,309 and 2,055,697 and British Pat. No. 1,397,133 were cited in the parent application Ser. No. 789,729.

The devices of the prior art have not proven satisfactory to provide a relatively high-speed, relatively low cost, high efficiency, compact device for deliquifying fruits and other materials.

Another shortcoming of the devices of the prior art is the tendency of the spaces in the screens or platen faces, through which the juice is expressed, to become clogged. These prior art apparatus make no useful provision for unclogging the apertures. Clogging of apertures reduces the rate of drainage of liquid from the press cage and may reduce the amount of recovered liquid, increase the press cycle time period and detract from the optimum efficiency of the press cycle.

BRIEF SUMMARY OF THE INVENTION

Apparatus and process for expressing or expelling a liquid from apples, sugar beets, grapes and the like or for extracting water or oil from such products as waste sludges or oil seeks, and utilizing a pair of opposing, vertically extending, horizontally moveable platens for expressing the liquid by compressing the fruit or other material.

The fruit (or other material being dewatered, dejuiced or deoiled) is discharged into an opening in the top of an enclosure or cage from a suitable storage means, an hydraulic-operated sliding door providing an open position in which the material to be deliquified is introduced, preferably by gravity feed. After introduction of that material into the cage or enclosure, the door is closed so that the material to be deliquified is completely enclosed by and substantially sealed in the enclosure. The open parallel ends of the enclosure are closed on one side by the back-up platen which abuts the outer edge of the enclosure and on the other side by the compressing or press platen which is sealingly and slidably seated within the inner edges of the opposite end of the enclosure.

The press platen is then indexed a distance sufficient to deliquify the material in the enclosure and to form a filter cake or press cake, desirably having a thickness of three inches to about ten inches, depending on the size of the unit and the nature of the material being deliquified. The expressed liquid, such as fruit juice, water or oil, for example, is permitted to drain through suitable drainage means provided in the enclosure itself and/or at the compressing faces of one or both of the platens, into a collection container located beneath the enclosure and into which the liquid drains by gravity. After the liquid has been expressed and the cake formed, the back-up platen is indexed away from the enclosure a distance slightly greater than the thickness of the filter cake and the press platen is indexed to the far end of the enclosure and slightly beyond it, so that the press platen displaces the filter cake through the opposite end of the enclosure, allowing the filter cake to be discharged and to fall, by gravity, into a suitable receptacle located below the discharge end of the apparatus, from which the filter cake may be removed, as by screw conveyor or the like.

In one embodiment of the invention, the pressure surface of each platen is desirably formed with a plurality of vertically extending grooves or channels, the material engaging side of which is covered by one or more screens to permit liquid to pass through the screens and be expressed through the grooves or channels in the platen and to drain out the bottom of the platens to an underlying receptacle.

In the preferred form of the invention, the enclosure or cage is of square cross-section and is formed of a plurality of spaced, rigidly connected metal bars, and the two opposing vertical ends and the bottom of the enclosure are desirably covered by suitable screens to permit easy drainage of liquid from the enclosure through the screens and bars into the underlying receptacle without permitting extrusion of any solid material, which is allowed to remain in the container and form part of the press cake. For some liquids, such as apple juice, it may be desirable to use a press cloth of fine fabric material overlying the screens in order to achieve a particularly fine filtration of the liquid being expressed.

Other benefits of the apparatus and process of the invention are easy and convenient discharge of filter cake, ease of servicing of the unit because of its minimum number of moving parts, the ability to press small quantities of material in short pressing cycles, thereby presenting the ability to press small or large amounts of material with low capital expenditure. Because there are no moving parts in the enclosure, other than the platens, close manufacturing tolerances may be achieved in the manufacture of the unit of this invention, thereby minimizing pulp leakage and allowing a more clear juice, both important advantages. The lack of many moving parts provides for minimum maintenance and no lubrication of moving parts is needed; these are also important advantages over the prior art. The high drainage area in the apparatus of the invention provided permits maximum drainage per cycle, assisting in reducing the time of the cycle. Moreover, the apparatus of the invention easily expresses the filter cake, which has been a problem in past apparatus. By allowing rapid pressing of smaller loads, faster juice expression is achieved, reducing cycle time per unit of juice produced, a significant benefit. The low solids content of the juice produced by the apparatus of this invention reduces the amount of filter aid needed for the expressed juice.

In the process of the invention, a material to be deliquified is introduced into a rigid enclosure and is completely surrounded by the walls of the cage or enclosure, the press platen and the back-up platen. The press platen, which tightly but slidingly fits within the enclosure, compresses the material, expressing liquid into an underlying receptacle, desirably through suitable screens and channels in both platen faces and in the bottom and sides of the enclosure. After the liquid has been expressed, the filter cake remains in the enclosure and the back-up platen is indexed away from the enclosure a distance greater than the thickness of the filter cake. The press platen is then indexed a further distance slightly greater than the thickness of the filter cake so that the filter cake is displaced out of the enclosure and drops by gravity into a suitable underlying receptacle (different from the underlying receptacle to collect the liquid). The thickness of the final press cake will depend, in part, upon the particular material being treated (e.g., apples, linseeds) its condition (e.g. partially dejuiced, overripe, etc.) and on the size of the machine being used.

In the preferred embodiment of the invention, the press platen and the back-up platen are formed with alternating elongated slots at their inner faces. One set of slats is fixed to the platen face and the alternating slats are movable during a portion of the press cycle. Apertures for drainage of liquid through the platens from the press area are provided by the spaces between the stationary and movable slats, communicating with vertical apertures within the platen face. Each of the moveable slats is fastened to a spring-loaded guide arm which slides in an aperture in the platen face and is spring-loaded to a position where the inner faces of the stationary and movable slats are coplanar. An abutment member is fixed to the press frame and when the platen moves so that the movable guide arms are displaced by encountering the abutment upon movement of the hydraulic piston mounting the platen, the movable slats are displaced with respect to the stationary slats and any pulp from the material being filtered which had been caught between the slats breaks loose, thereby maintaining optimum drainage through the spaces between the stationary and the movable slats.

OBJECT OF THE INVENTION

It is therefor an object of this invention to provide an automatic press apparatus and process capable of quickly and efficiently deliquifying a mass of material, using a single press stroke and occupying a minimum amount of floor area.

Another object of this invention is to provide an automatic press apparatus and process capable of achieving substantially complete retention of all solid material in a filter cake and of expressing relatively solid-free juice or other liquid therefrom.

Yet another object of the invention is to provide a deliquifying process and apparatus providing a very high rate of drainage to provide for a very short operating cycle.

A further object of this invention is to provide a deliquifying press apparatus having a minimum number of moving parts, whereby optimum tolerance of all components can be achieved for maximum machine efficiency with minimum expense and maintenance.

Still another object of this invention is to provide a press apparatus comprising a rigid enclosure made up of spaced, interconnected bars forming an enclosure of substantially square cross-section, the interfaces of the slats being covered by suitable metal screening to permit high drainage of liquid from the enclosure while retaining particulates within the enclosure.

An important object of this invention is the provision of a deliquifying press apparatus providing means for expressing liquid through apertures in at least one platen face, said platen face comprising a plurality of fixed and movable members defining apertures there between and means to displace said movable members with respect to said fixed members to dislodge any solid material which becomes wedged there between the press cycle.

Still another object of this invention is to provide a platen construction having a self-cleaning feature for consistent optimum drainage of filtrate from the press area.

DETAILED DESCRIPTION OF THE INVENTION

Figure 1:
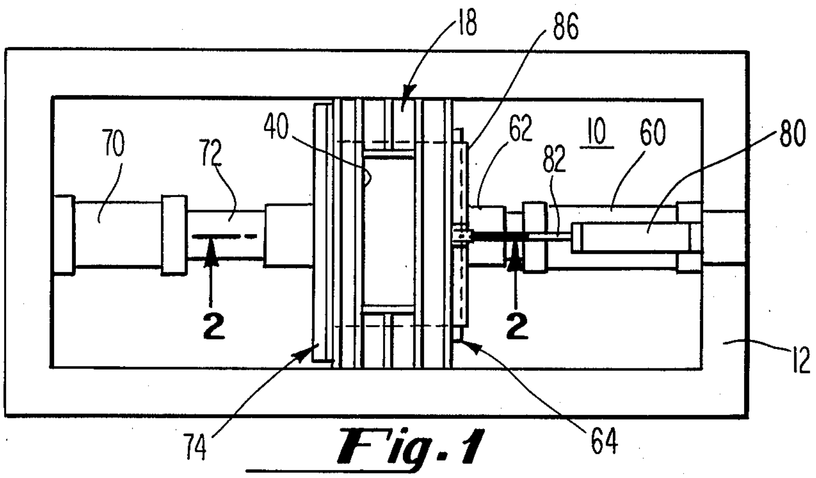
FIG. 1 is a top plan view of the apparatus of the invention in the position immediately prior to compression.

Viewing FIG. 1, the press unit, generally designated by numeral 10, is seen to comprise a suitable metal frame 12, preferably made of steel and the details of which will be apparent to one of ordinary skill in the art. Mounted within the frame 12, as by welding of its side members to the frame, is a cage or enclosure, generally designated by numeral 18. Cage 18 is the enclosure into which the fruit or other material to be deliquified is transferred and in which the deliquification takes place.

Figure 5:
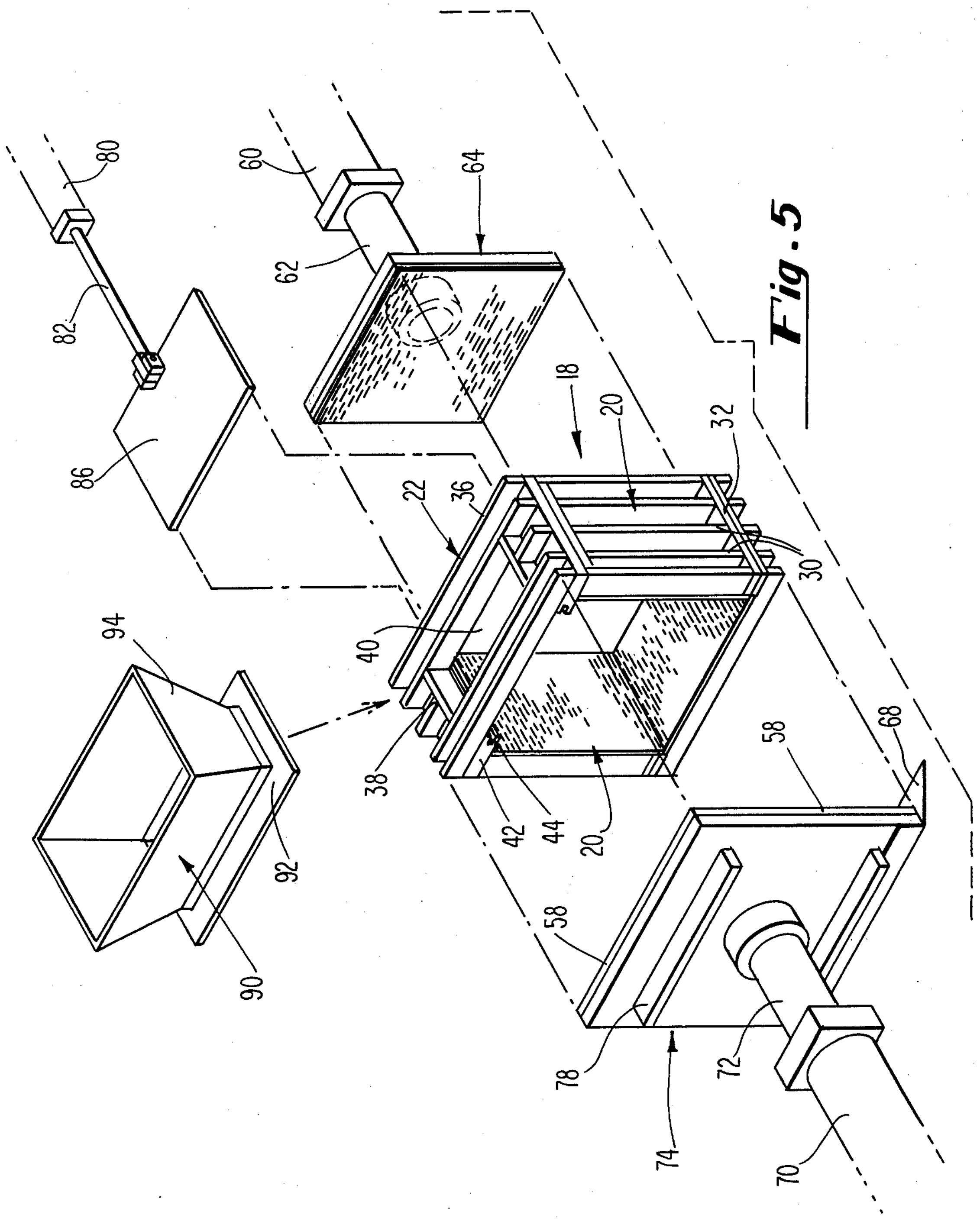
FIG. 5 is an exploded view of the apparatus of FIG. 1, showing the individual parts and their interrelationship.

As best seen in FIG. 5, cage 18 comprises sides 20 formed of a plurality vertically extending ribs or bars 30 which are interconnected by horizontally extending struts 32 to form rigid, permeable sides, liquid being able to pass in the spaces between the respective ribs. The top of cage 18 is generally designated by numeral 22 and is comprised of a plurality of elongated ribs 36 interconnected by struts 38 to form a rigid top. An opening 40 is formed in the top 22 for the purpose of admission of the material to be liquified. Also forming part of the top are bar members 42, one of which is located on each side of the top 22, each of which has a slot 44 formed therein and extending along its entire length, and in which the cover 86 slides.

Figure 2:
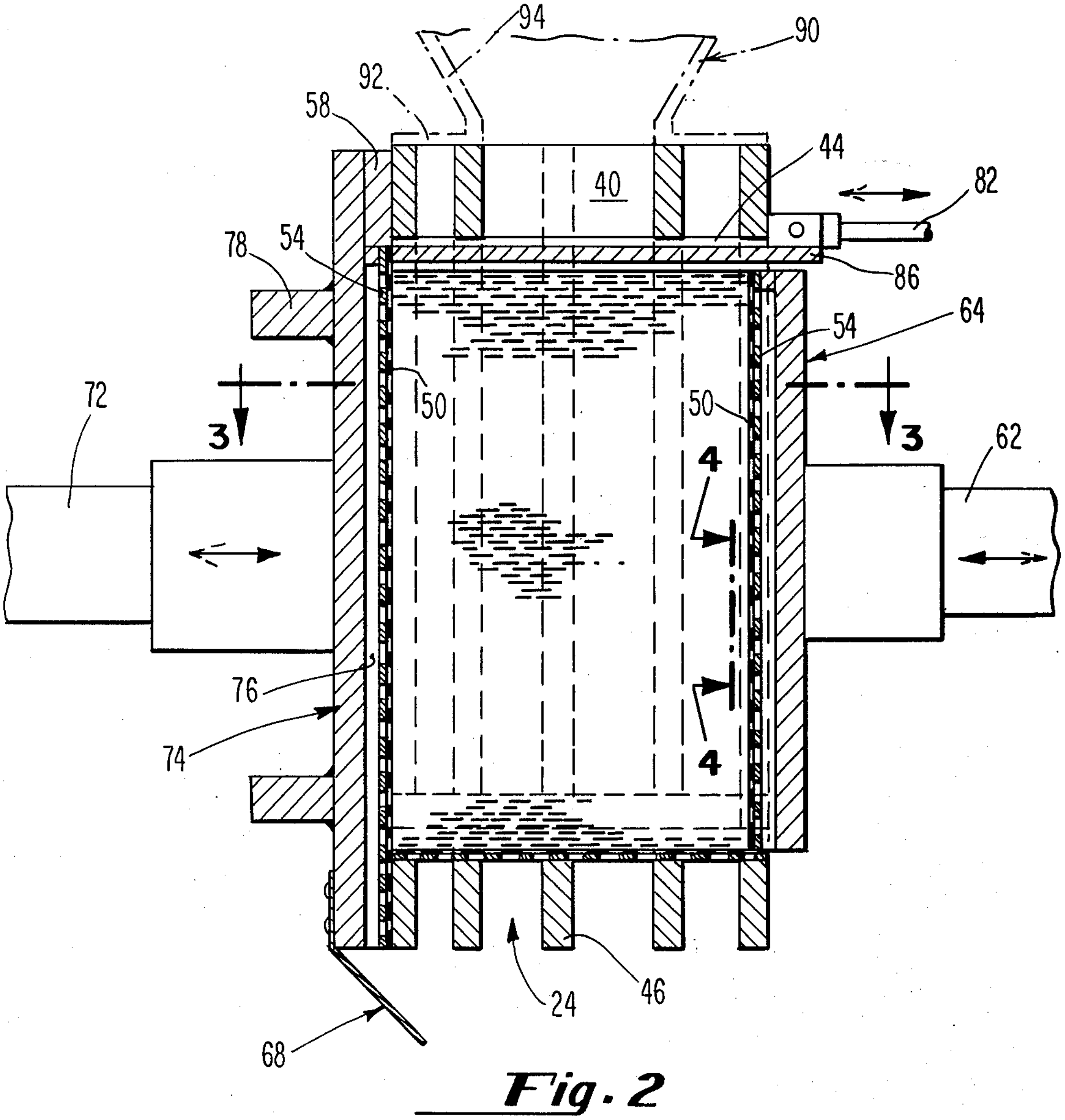
FIG. 2 is a cross-sectional view, taken along the line 2—2 of FIG. 1.
Figure 3:
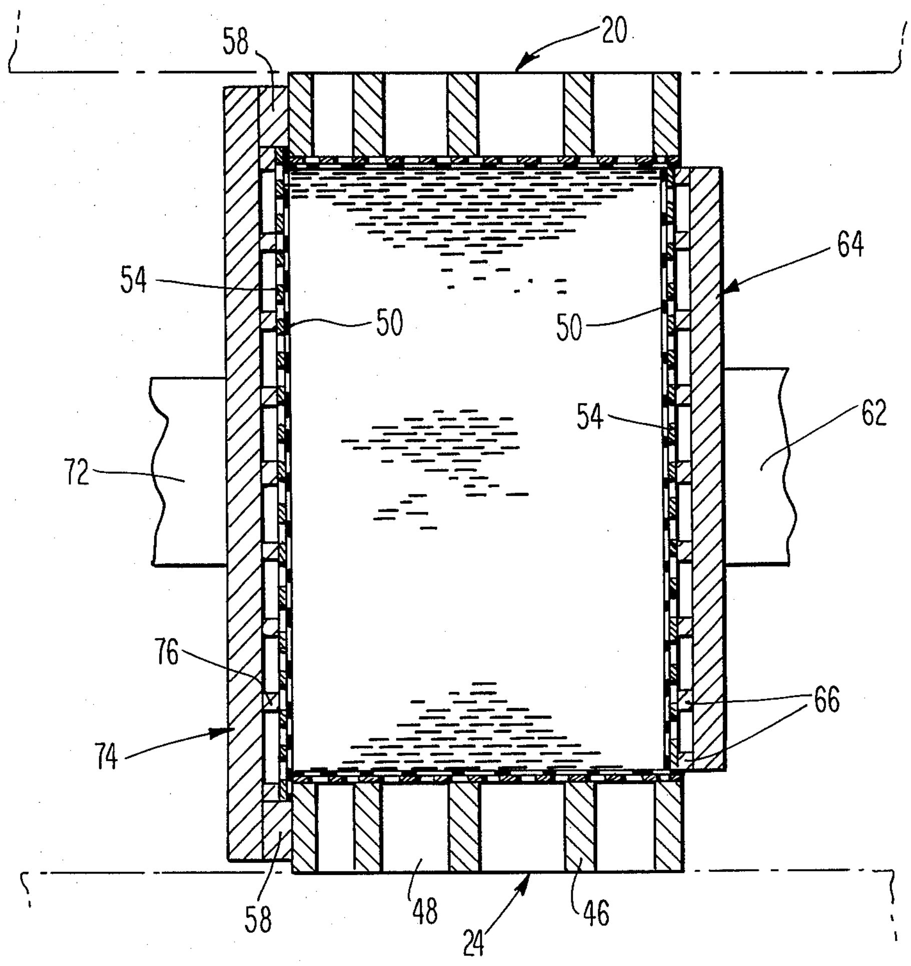
FIG. 3 is a fragmentary cross-sectional view, taken along the line 3—3 of FIG. 2, showing the sides of the enclosure and the construction of the screens.

As best seen in FIGS. 2 and 3, the bottom 24 of cage 18 is similarly formed of a plurality of elongated ribs 46 which are rigidly interconnected by suitable cross pieces or struts 48. Mounted on top 22 of enclosure 18, as by welding or by use of suitable fasteners (not shown) is the feedhopper 90, including a base portion 92 which overlies the top 22 of the basket and a chute portion 94 which overlies the opening 40 in the top of the basket. The top or cover 86 of the basket is rigidly fastened to the piston 92 of a suitable piston and cylinder unit, the cylinder being designated by numeral 80. Cylinder 80 is suitably and rigidly mounted to frame 12, as generally indicated in FIG. 1.

As seen in FIG. 1, cylinder 60, which operates the press platen 64, has one end rigidly mounted to frame 12 and the other end displaceably supporting piston 62. Press platen 64 is rigidly attached to the end of piston 62 and extends vertically.

As best seen in FIG. 3, the press platen 64 has a plurability of vertically extending, horizontally spaced ribs or bars 66, for example of ½ inch by ½ inch cross-section, fastened thereto, as by welding or bolting, in order to provide a plurality of vertically extending channels therebetween. The struts and bars which form the sides, bottom and top of the cage 18 are desirably formed of one by three inch stainless steel bar stock, although their precise dimensions are not critical to the process or apparatus of the invention, so long as enough spacing is provided to allow good drainage. Overlying the bars 66, and fastened thereto as by the use of suitable nuts and bolts (not shown) are two metal screens.

Figure 4:
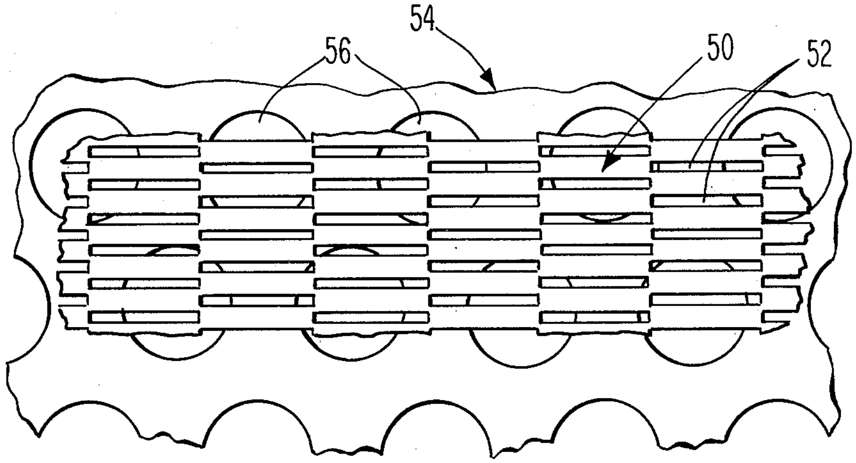
FIG. 4 is a fragmentary front-elevational view, along line 4—4 of FIG. 2, showing two screens.

As seen in FIG. 4, the outer screen, which abuts the bars 66, is generally designated by numeral 54 and has formed therein a multiplicity of circular apertures, generally designated by numeral 56. Adjacent to screen 54 is inner screen 50, which has elongated, spaced rectangular slots 52 formed therein.

In a preferred form of the invention, the screens 50 and 54 are made of stainless steel. The circular apertures in screen 54 desirably have a radius of ¾ inch and the slots 52 have dimensions of ¾ inch by 0.040 inch. The back-up screen 54 is desirably made of 3/16" sheet metal, to provide the necessary support, whereas the screen 50 which will be the majority of the filtration is only made of 1/16" sheet metal. The holes occupy about 50% of the surface area of screen 54, whereas the slots in screen member 50 occupy fifty to sixty percent of the surface area of that screen. If the apparatus of the invention is being used for fruits, such as apples, it may be desired to use a suitable press cloth, located on the inside (with respect to cage 18) of the screen 50, to provide even better filtration of small particulate from the expressed liquid.

The particular dimensions of the apertures in the screens and even the shapes and density of those apertures can be varied widely according to the type of material being deliquified and the extent of filtration of particulates desired to be achieved. In the embodiment illustrated in FIG. 4, screens 50 are constructed to provide fine filtration of particulates and screens 54 function primarily to support screens 50 structurally and permit rapid drainage of liquid therethrough.

The screens abutting sides 20 of cage 18 and the bottom 24 of the cage, as well as those abutting back-up platen 74 are all of the construction described above. It may be desired to use different screen constructions in different locations, or it may be desired to permit drainage only from the platens or only from the enclosure 18 and to omit screens in some locations altogether. However, in the preferred embodiment of the invention, it is desired to provide drainage as illustrated through all surfaces of the enclosure around the surfaces of both platens, in order to achieve maximum drainage, and to cover each of the draining surfaces with suitable screens for optimum filtration.

Back-up platen 74 is seen in FIGS. 2 and 3 to be substantially greater in vertical and horizontal extent than the inner dimensions of the basket 18, so that the edge members at the top and side edges of the back-up platen abut the adjacent ribs of the top 22 and the two adjacent sides 20. Welded on the back of the back-up platen 74, as best seen in FIG. 2, are horizontally extending stiffeners 78. The dimensions of the back-up platen are the same as the outer dimensions of the downstream end of cage 18, and the back-up platen, similar to the press plate, has a multiplicity of vertically extending spaced bars 76 of half-inch bar stock welded thereon to form drainage channels. An outer screen 54 abuts the bars and inner screen 50 is fastened to the outer screen and faces the interior of cage 18.

Bar members 58 on the top and sides of back-up platen 74 act as spacers and provide a gap at the bottom of the back-up platen (as seen in FIG. 2) to permit drainage of juice through the channels formed in the back-up platen.

Back-up platen 74 is rigidly mounted to piston 72 which rides in cylinder 70, the opposite end of which is rigidly fastened to frame 12. Mounted at the base of the back-up platen and extending along its entire width is a deflector member 68, the purpose of which is to deflect any juice draining from the back-up platen inwardly so that it will discharge down to the juice collector 96, as seen in FIG. 6*b*. Also viewing FIG. 6, there will be seen the filter cake collector 98 which has a screw conveyor 88 mounted therein for the purpose of conveying the filter cake material to a suitable location.

Although the particular dimensions of the apparatus of the invention may vary within wide limitations according to the specific use for which the apparatus and process are put, the following constitute the dimensions of a preferred embodiment of the invention, a small unit specifically adapted for pressing apples to produce apple juice. The outer dimension of press platen 64 (and therefore the cross-section of cage 18) is 16 inches by 16 inches, and hydraulic piston 62; on which it is mounted, has a stroke of 10 inches, equal to the longitudinal dimension of cage 18. The hydraulic cylinders 60 and 70 have working pressures of up to 3000 p.s.i. and are capable of producing pressures of up to 500 p.s.i. The normal working pressures of cylinders 60 and 70 will desirably be 3,000 p.s.i. The diameter of cylinder 70 is greater than the diameter of cylinder 60 to create a back pressure, preventing displacement of the back-up platen 74 and leakage during pressing. In the embodiment shown cylinder 60 has a seven inch diameter and cylinder 70 an eight inch diameter. The necessary pressure on the press cake to dejuice a particular material will be in the range from 30 psi to 500 psi, depending upon the product being dejuiced.

In a large-scale commercial embodiment of the invention, for use in dejuicing apples, the dimensions of the press platen would be thirty two inches by thirty two inches, with a press platen travel of 10 inches. Of the ten inches of press platen travel, 8 inches is the distance of travel in the press cycle, from the position shown before pressing is commenced in FIG. 6*a*, to the position (not shown) beyond that position illustrated in 6*b*, in which the compression of the mass being deliquified is completed. Once compression is completed, another 2 inches of press platen travel is required to displace the filter cake to and slightly beyond the distant edge of cage 18 so that it may drop by gravity, as seen in FIG. 6*c*, into the underlying receptacle 98. As noted, cylinder 60 has a seven inch bore and the piston 72 has a ten inch stroke, whereas the back-up cylinder 70 has an eight inch bore and its piston 72 has a five inch stroke. It is also to be noted that the relative displacements of the two platens and the consequent thickness of the filter cake being produced can be varied to suit the particular material being deliquified.

The back-up platen is of larger area than the press platen, inasmuch as it extends beyond the inner open area of basket 18 and the desirable dimensions of the back-up platen in the illustrated embodiment, when the press platen is 16 inches by 16 inches is 21 inches by 22 inches, the outer cross-sectional dimension of the cage 18.

Since hydraulic cylinder 80 does not perform a pressing function, as do hydraulic cylinders 60 and 70, the operating pressure of hydraulic cylinder 80 may be much lower than that of cylinder 60 and 70, but desirably is 3,000 psi.

The foregoing dimensions and operating pressures may be varied widely, in order to suit the particular commercial needs of an operation desired to dejuice, dewater or deliquify a mass of material. For example, for pressing grapes, a much larger cage and platen would be used, the platen desirably having face dimensions of up to six feet by six feet. On the other hand, grapes are pressed much more slowly, and under less pressure than apples, so that the pressure generated by the hydraulic cylinder 60 and 70 can be lower than that which would be required if apples were being pressed.

The particular number of screens and the dimensions, shapes and placement of the apertures in those screens to permit flow therethrough of the liquid being expressed (while containing solid particles) by the apparatus of the invention can also be varied, and the application illustrates a preferred embodiment particularly adapted for use in connection with the production of apple juice. As noted above, in producing apple juice, it is desirable to firmly mount a press cloth over the screens 50 to insure a finer filtration of particulates than is possible with the use of the screens alone.

Figure 6A:
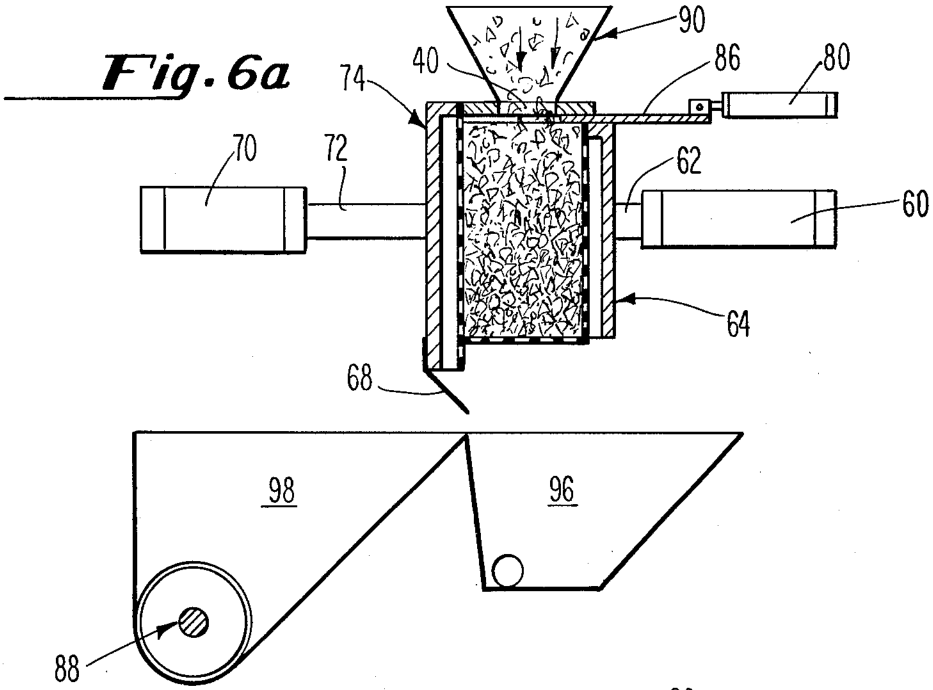
FIG. 6*a* is a schematic view showing the apparatus of the intervention in the filling condition, prior to closing of the enclosure for compression.
Figure 6B:
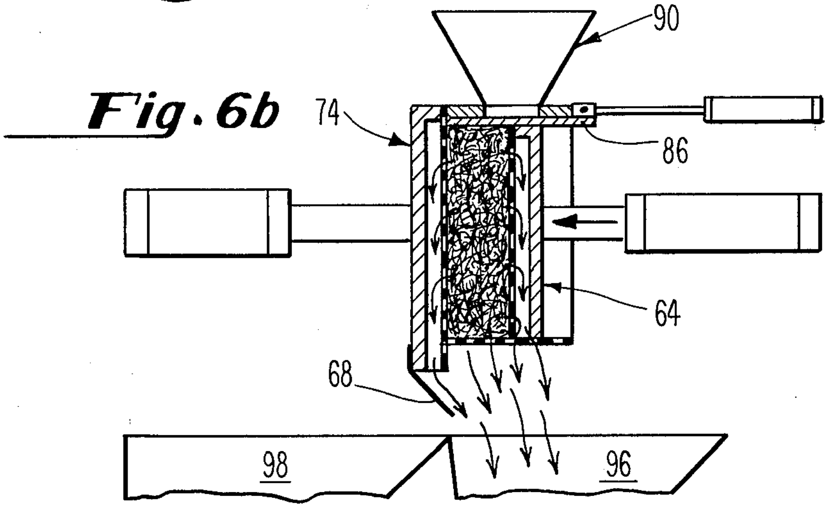
FIG. 6*b* is a view similar to FIG. 6*a*, with the door of the enclosure closed, and the press platen in the compressing position with liquid draining around the two platen faces and through the base of the enclosure.
Figure 6C:
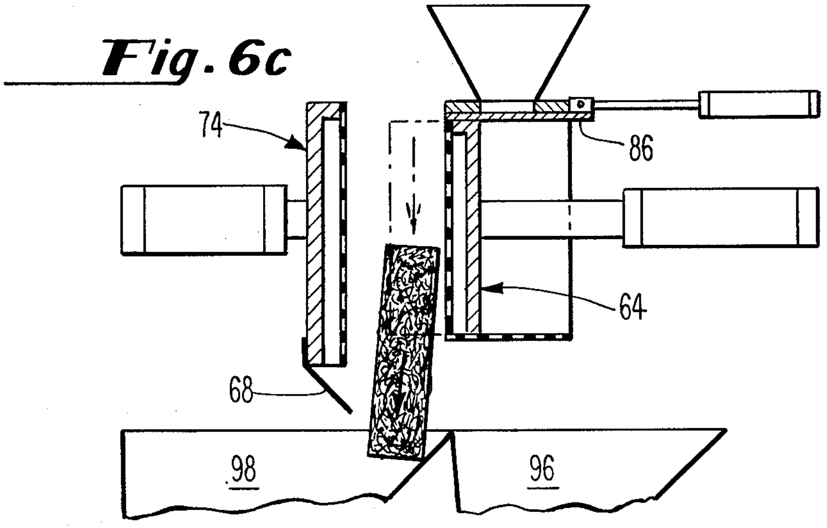
FIG. 6*c* is a view similar to FIG. 6*a*, showing a filter cake being discharged.

In the process of the invention, the apparatus is initially in the position illustrated in FIG. 6*a*, with cover 86 retracted by hydraulic cylinder 80 to the position illustrated, so that opening 40 is unblocked. In that position, the mass of fruit, nuts, sludge or other suitable material to be dejuiced, dewatered or deliquified is introduced into basket 18 by gravity feed through hopper chute 94 of feed hopper 90. Hydraulic cylinder 80 is then actuated to slide cover 86 in slots 44 to close opening 40 in the top of cage 18. In this position, the cage is substantially completely closed, with platen 74 sealingly abutting three sides of the rear end of basket 18, in the manner best shown in FIGS. 2 and 3, but leaving a channel at the lower edge of the platen, as seen in FIG. 2, for the drainage of liquid that passes through screens 50 and 54. As also seen in FIGS. 2 and 3, platen 64 is substantially sealingly seated just inside the opposite edge of cage 18.

In one embodiment illustrated herein, drainage of expressed liquids is possible through five surfaces. Drainage can occur through respective sets of screens 50 and 54 through the bottom 24 of cage 18, the two sides 20 of cage 18, and through screens 50 and 54 and the channels between respective bars 66 and 76 of the two platens 64 and 74. This provides considerable drainage area to allow rapid removal of expressed liquid in order to permit the deliquification cycle to be completed in the briefest possible time. In some instances, it may not be necessary for particular liquids to have that much drainage, and it is within the purview of this invention that no drainage be permitted with respect to one or more (but not all) of the bottom and sides of the enclosure and platens 64 and 74; however, at least three drainage surfaces are desired at all times.

In the illustrated embodiment, the compressing cycle involves a displacement of platen 64 for eight inches in the longitudinal direction into cage 18. While this displacement is taking place, the mass of fruit or other material being deliquified is being compressed and juice is being expressed through the screens as schematically illustrated in FIG. 6*b*. When the substantially dry press cake has been formed and the compression cycle has been completed, press platen 60 continues its displacement toward back-up platen, but back-up platen is then actuated to displace away from press platen. While the press platen is displacing the final two inches plus a slight additional distance of its cycle to the far edge of cage 18, as seen in FIG. 6*c*, back-up platen is displaced about five inches, in order to provide ample room for the press cake to be discharged by gravity into receptacle 98, from which it is conveyed, as by screw conveyor 88, to a suitable receptacle for further handling.

As seen in FIG. 6*b*, the deflector 68 deflects any juice which is expressed through back-up platen 70, underneath the cage 18, so that it is discharged into juice receptacle 96, rather than into the filter cake receptacle 98.

The timing of the entire filling, compressing, and discharging cycle will be up to 150 seconds per cycle. In a preferred cycle, one second is used to open the basket cover 86, three to ten seconds to fill the cage 18, two seconds to close cage cover 86, fifty to sixty seconds for the compression portion of the cycle and ten to fifteen seconds for the press cake displacement and three seconds for the return of the two platens from the position of FIG. 6*c*, after the cycle is completed, to the position of FIG. 6*a* for the commencement of the next cycle. The specific time of each segment of the cycle can be varied to suit the particular type and quantity of material being deliquified and the size of apparatus being used.

The preferred embodiment of the invention is illustrated in FIGS. 7 to 11 inclusive. This embodiment is generally similar to that illustrated in FIGS. 1 to 6 inclusive. The primary difference is the self-cleaning provision for clearing the spaces in the platen faces in which solid material may become jammed. Clogging of the drainage apertures in the platen faces substantially reduces the efficiency of the process and apparatus, reducing the drainage rate, increasing the press cycle time in order to achieve optimum drainage and increasing oxidation of the expressed liquid due to the increased time of a press cycle. Increased oxidation is undesirable since it reduces the quality of the liquid.

Figure 7:
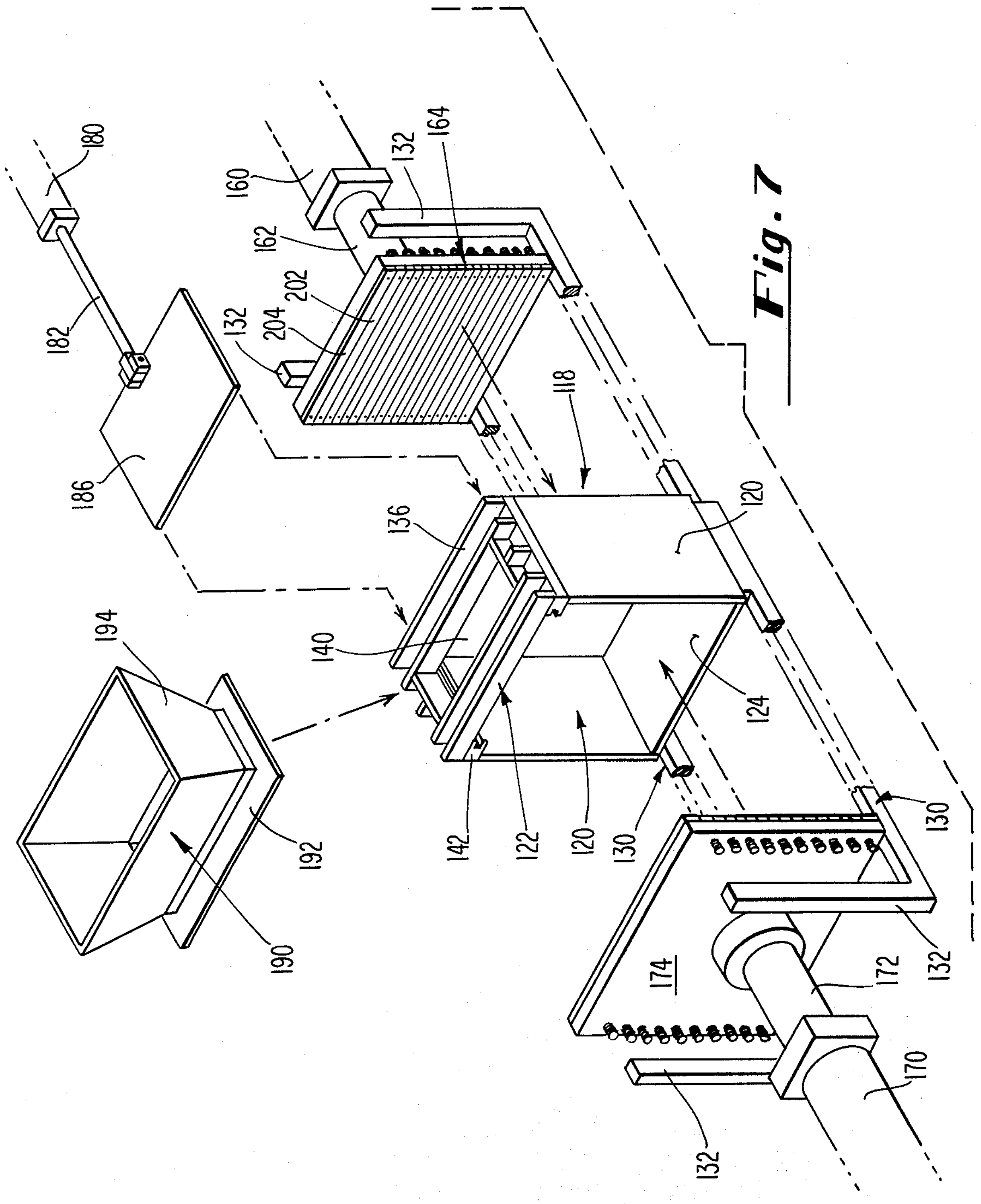
FIG. 7 is an exploded view, similar to FIG. 5, showing the preferred embodiment of the apparatus of this invention.

In the embodiment of the invention illustrated in FIG. 7, cage 118 is seen to comprise solid sides 120 and solid bottom 124, rather than the apertured sides and bottom illustrated in FIGS. 1 to 6. With the embodiment of FIGS. 7 to 11, all liquid which is expressed from the pulp mass being deliquified is drained through the back-up platen 174 where it exists in the drainage gap, referred to by numberal 178 and best seen in FIG. 8 and the press platen where it exits through vertical channels 232. The reason for preferring to limit the surface of drainage of liquid by making the sides 120 and bottom 124 non-permeable is so that the mash or pulp being pressed has a greater press area which includes the sides 120 and bottom 124; this also aids in producing a clear effluent. In all other respects, the feed hopper 190, cover 186 and cage 118 are the same as those illustrated in FIGS. 1 to 6.

Rididly fastened to cage 118, for example, or to another rigid portion of the press frame are L-shaped members 130 which include rigid vertical stop sections 132. Members 130, including the vertical sections 132, may be made of one-half-inch square stainless steel bar stock and are located to engage the ends 214 of guide members 210 during the retraction portion of the press cycle.

Press platen 164 is seen to comprise (as viewed in FIG. 9) a rear section 168 to which there if fastened, as by welding, (or from which there is machined) ribs 166 which define one-half inch vertical channels 232 therebetween and end members 206. The purpose of the channels 232 is to permit drainage of liquid from the press platen surface into a suitable container located beneath the cage and platens in the manner shown in FIG. 6*a*.

Figure 10:
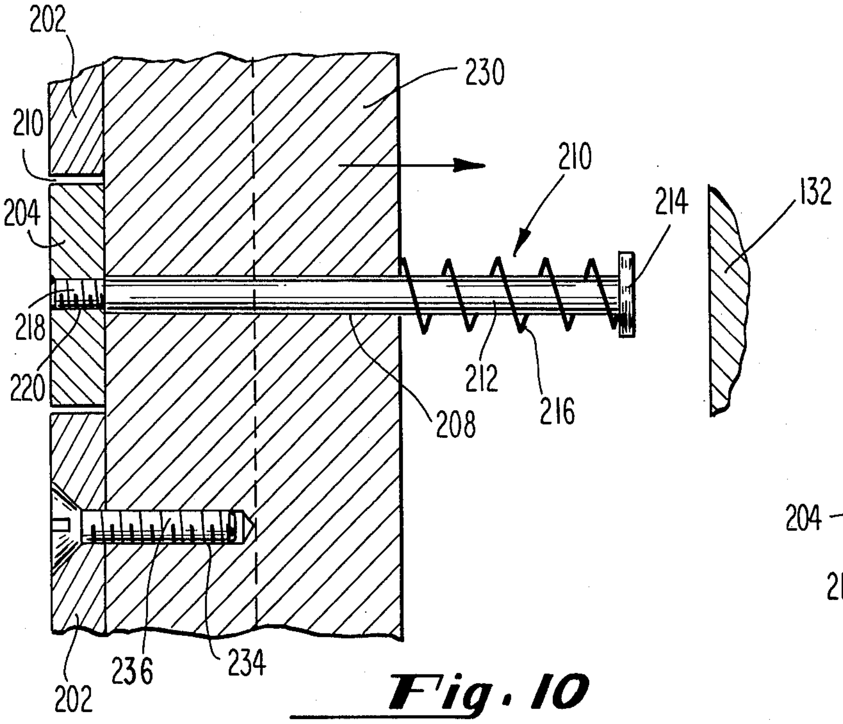
FIG. 10 is a fragmentary cross-sectional view, taken along line 10—10 of FIG. 9.
Figure 11:
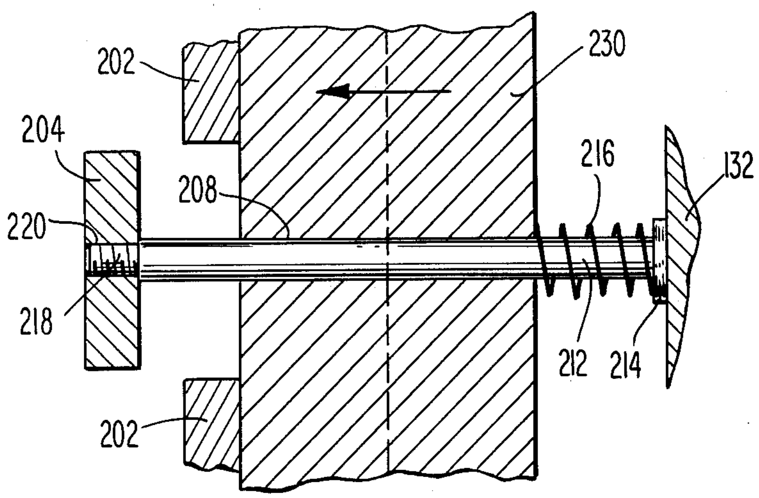
FIG. 11 is a view similar to FIG. 10 showing a movable sat in the displaced position.
Figure 9:
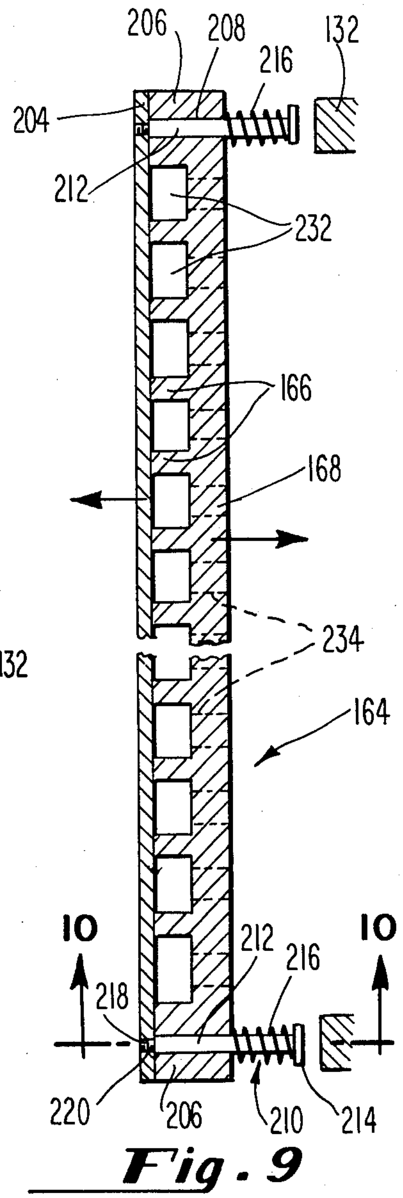
FIG. 9 is a cross-sectional view of the press platen, taken along line 9—9 of FIG. 8.

Viewing FIGS. 7 and 11, fastened over the upstanding ribs 166 of the press platen are spaced stainless steel slats 202 which are rigidly fastened to the end ribs 206, as by screws 236 in threaded apertures 234. Alternating with the fixed slats 202 are movable slats 204 of equal size and dimension. As best seen in FIG. 10, spaces are formed between the proximate surfaces of slats 202 and slats 204 so that juice or other liquid expressed during the press cycle will drain through the apertures 210 into the vertical apertures 232 formed between the ribs 166 and exit the press through the apertures 234 formed in the base of platen member 168, at least one aperture 234 corresponding to each of the vertical channels 232. A suitable catch basin, of the sort designated by numeral 96 and schematically illustrated in FIG. 6*a*, would catch such expressed liquid.

The movable slats 202 are displaceably secured to platen 164 by guide pins or arms 210, one such guide pin 210 being located at each end of each movable slat. Each guide pin 210 has a shank member 212, an enlarged head 214 and a threaded end 218.

Threaded end 218 of each guide pin is threaded in a suitable aperture 220 in each movable slat 204. A compression spring 216 bears at one end adjacent the collar 214 and at its other end against the back of platen member 168, one compression spring 216 being mounted on each guide pin 210. Guide pins 210 serve to mount slats 204 in position and allow them to be displaced away from platten member 164, in the manner shown in FIG. 11, when the platen member is in the retraction portion of the deliquifying cycle, in which instance each of the pins 210 engages rigid upstanding abutment or arm 132 and is displaced against the force of springs 216, moving slats 204 to the position shown in FIG. 11 and breaking up any pieces of material being pressed which have clogged apertures 210. Any dislodged material drops by gravity into cage 118. When platen 164 is moved away from its abutments 132 at the beginning of the compression stroke, the force of springs 216 displaces the movable slats 204 back to the position illustrated in FIG. 10 for the compression stroke.

When the initial displacement of slats 204 away from platen 164 occurs during the retraction portion of the cycle, any pulp or other material which tends to get clogged in the spaces 210 between the fixed and movable slats 202 and 204 is displaced away from the apertures, and falls by gravity to the bottom of cage 118, thereby clearing apertures 210 once during each compression cycle, keeping apertures 210 clear to permit rapid and efficient drainage of expressed liquid from the cage during the compression part of the cycle.

Figure 8:
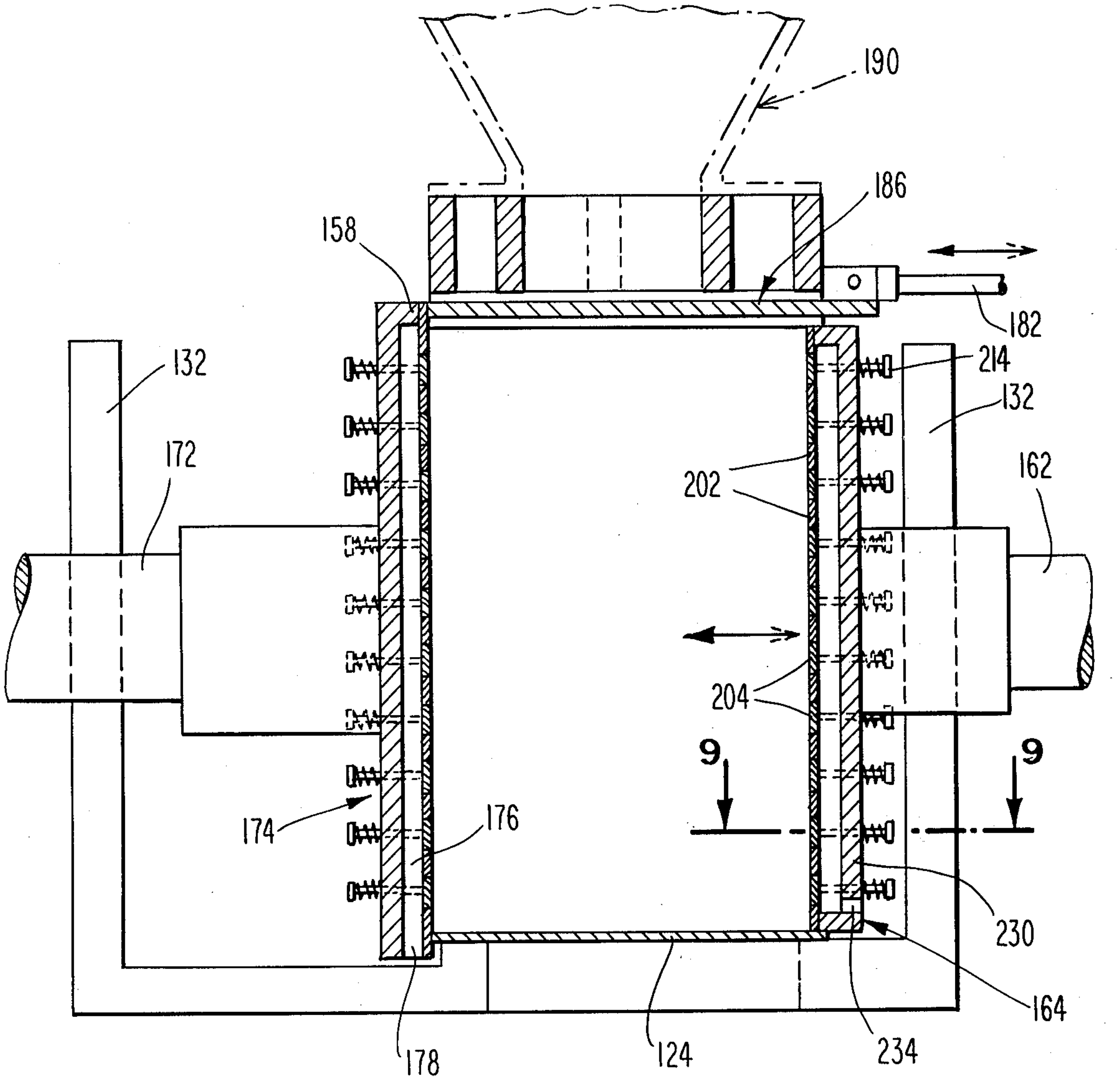
FIG. 8 is a vertical cross-sectional view, similar to FIG. 3, but illustrating the embodiment of FIG. 7.

Back-up platen 174 is similarly provided with fixed slats 202 and spaced movable slats 204, each of the movable slats being mounted for sliding with two guide pins 210 thereon, and spring-loaded to the closed position shown in FIG. 8. In all respects, the construction of the fixed and movable slats, their mounting, and their method of displacement from the fixed slats are the same for the back-up platen as illustrated and described with respect to the press platen. The movable slats on the back-up platen are displaced when the back-up platen is in the retracting position, away from the cage, so that the guide pins 210 are engaged by vertical abutment members 132 to displace movable slats 204 as the back-up platen completes its withdrawal portion of the press cycle.

Although the spacing between slats 202 and 204 is shown as rectangular, it is within the purview of this invention to have the inner edges of the slate converge, rather than being parallel, in order to facilitate drainage.

The particular size of the slats 202 and 204 and the size of the drainage channels 232 is a matter of choice. The spacing between slats 210 may be varied, depending upon the material being deliquified. Too small spaces will not permit adequate drainage, whereas too large spaces would allow solid particles to escape with the drained liquid. Furthermore, although the drainage apertures are shown as defined by rectangular slats, other shapes of apertur-defining members may be employed without departing from the scope of this invention.

It is to be noted that it is preferable to close the sides and the bottom of cage 118, so that all drainage of liquid from the cage occurs through the apertures 210 in the press platen 164 and the back-up platen 174.

It will be noted that, if the apparatus of this invention is utilized to press a food product, the material of the cages, platens, screens and all other parts contacting the cake or juice necessarily are made of stainless steel or other material which complies with applicable good manufacturing practices standards for foods.

It will be appreciated that the disclosed embodiment can be varied without departing from the spirit and scope of the invention. For example, various changes of dimensions and materials and changes in the sizes and shapes of the screen apertures can be made within the purview of this invention.

What is claimed is:

1. An apparatus for deliquifying compression material comprising:

(a) a frame;

(b) a rigid cage fixidly mounted on said frame;

(c) said cage comprising a pair of sides a bottom, vertically extending parallel open front and back ends and a slidable, sealable top providing an opening for the introduction of compressible material;

(d) a first press platen substantially sealingly and slidably mounted in one end of said cage and adapted to be displaced to the other end of said cage;

(e) a second backup platen substantially sealingly, slidably mounted in the other end of said cage and adapted to be displaced out of and away from said cage in opposition to said first platen;

(f) each of said platens having an inner face;

(g) at least one of said platens having a plurality of alternating movable and non-movable members comprising said inner face and defining a liquid channel therebetween, said liquid channel extending through said platen to permit drainage of liquid into and away from said platen;

(h) means for displacing said movable portion of said platen with respect to said non-movable portion during a part of the cycle of movement of said platen, whereby said movement has the effect of self-cleaning of any solid material which may become entrapped in said channel.

2. Apparatus as set forth in claim 1, wherein one of said platens defined a multiplicity of spaced vertically extending channels and said inner face includes a plurality of alternating horizontally extending fixed slats and movable slats defining said channels, and means mounting said movable slats for displacement thereof during movement of said platen.

3. Apparatus as set forth in claim 3, wherein each of said movable slats is mounted on one or more spring-loaded guide pins extending through said platen and slideably mounted therein and wherein said cage is fastened to upstanding, rigid abutment means which engage said guide pins during a portion of the movement of said platen to displace said movable slats away from said inner face.

4. Apparatus as set forth in claim 2, wherein said guide pins are spring-loaded to urge siad moveable slats to a position where said movable slats and fixed slats are coplanar.

5. Apparatus as set forth in claim 1, wherein both platens have said movable and non-movable members.

6. A process for the deliquification of fruits and other compressible materials comprising the steps of:

(a) introducing a mass of material to be deliquified into a compression area;

(b) rigidly and completely surrounding said mass of material;

(c) indexing a single planar surface against said mass of material while rigidly enclosing said mass on all other sides to express liquid therefrom and form a press cake;

(d) collecting expressed liquid from said material through at least the inner face of said planar surface;

(e) completing indexing said planar surface and contemporaneously indexing a parallel and second closing surface to displace the press cake out of said compression area for discharge;

(f) returning said first platen to its position at the commencement of said cycle; and (g) contemporaneous with the return of said press platen, self-cleaning said press platen to remove solid material entrapped in the face thereof.

* * * * *